United States Patent
Yagi et al.

(10) Patent No.: US 7,291,025 B2
(45) Date of Patent: Nov. 6, 2007

(54) BUS BAR MOUNTING STRUCTURE

(75) Inventors: Sakai Yagi, Makinohara (JP); Yoshiaki Ichikawa, Makinohara (JP); Shigeki Matsumoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/411,923

(22) Filed: Apr. 27, 2006

(65) Prior Publication Data

US 2006/0291526 A1  Dec. 28, 2006

(30) Foreign Application Priority Data

Apr. 28, 2005  (JP)  ............................ P2005-133567

(51) Int. Cl.
*H01R 12/00* (2006.01)
(52) U.S. Cl. ...................................... 439/76.2; 439/949
(58) Field of Classification Search ............... 439/76.2, 439/949
See application file for complete search history.

(56) References Cited

U.S. PATENT DOCUMENTS

2002/0061666 A1 * 5/2002 Sato .......................... 439/76.2

FOREIGN PATENT DOCUMENTS

JP  2004-282908 A  10/2004

* cited by examiner

*Primary Examiner*—Ross Gushi
(74) *Attorney, Agent, or Firm*—Sughrue Mion Pllc.

(57) ABSTRACT

A guide wall and a recessed portion for accommodating therein a female-female terminal are formed in a lower case, and in an intermediate plate, a through hole through which an electric connection portion which is in abutment with the guide wall is formed and a guide portion is provided at a lower edge portion of the through hole so formed so as to protrude therefrom so as to be brought into abutment with the electric connection portion, so that the electric connection portion is guided into the through hole. Thus, by inserting the intermediate plate between the upper case and the lower case so as to be held therebetween, the guide portion automatically corrects the bend of the electric connection portion.

4 Claims, 5 Drawing Sheets

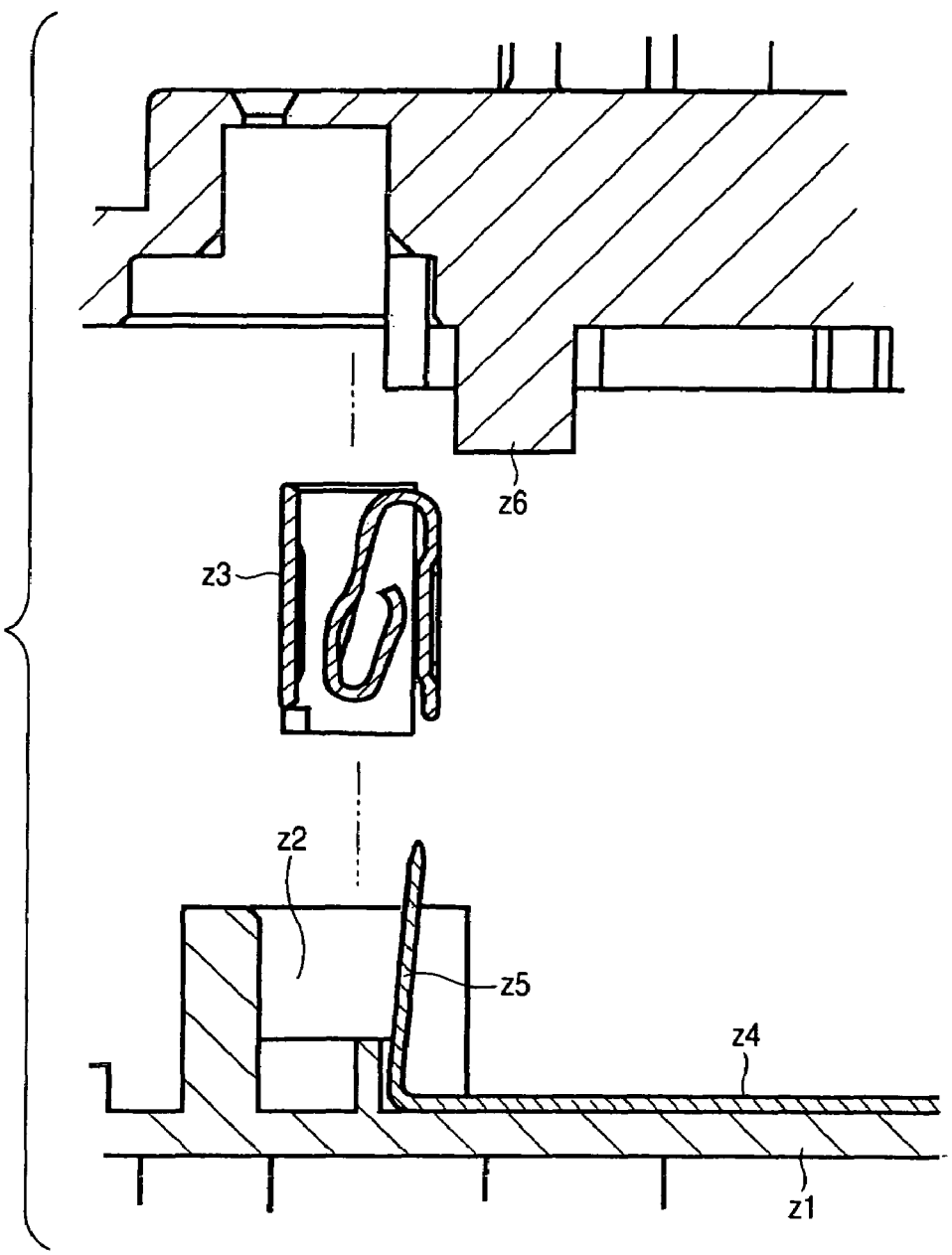

BUS BAR MOUNTING STRUCTURE

BACKGROUND OF THE INVENTION

1. Field of the Invention

The present invention relates to an improved mounting structure of a strip-shaped bus bar including an electric connection portion adapted to be connected to an external element such as a female-female terminal to an external element such as a female-female terminal.

2. Related Art

In many cases, an electric connecting apparatus which handles a high voltage within a limited space uses a strip-shaped bus bar which is laid out in an interior thereof for arrangement electric wiring therein, and there is raised as an example thereof an electric junction box for use as an automotive component.

For example, when used in an electric vehicle, this electric junction box is such that a battery, an ignition switch, an inverter and the like (none of which is shown) are provided so as to be wired by way of the electric junction box, whereby a solenoid relay is activated based on an output signal from the ignition switch, so that a main electric power is sent to the inverter while detecting the state of the battery by a voltage sensor (refer to, for example, JP-A-2004-282908 (Page 1, FIG. 1)).

To describe an example of the configuration of an electric junction box like this, for example, as shown in FIG. 6, the electric junction box is configured so as to include a lower case z1 having provided therein a recessed portion z2 which accommodates therein a distributing component accommodating portion (not shown) which accommodates therein, in turn, a fuse, a solenoid relay, a voltage sensor or the like and a female-female terminal z3, a bus bar z4 which is laid out in the lower case z1 and whose electric connection portion z5 is projected into the recessed portion z2, a female-female terminal z3 which is fittingly inserted into the recessed portion 2 so as to be electrically connected to the electric connection portion 5 and an upper case z6 which is detachably fitted on the lower case z1, to thereby supply a main electric power to an inverter or the like by means of an ON/OFF operation of an ignition switch.

In addition, to describe in more detail, the bus bar is formed by being blanked out from sheet metal having conductivity such as sheet copper into a batten shape to provide for a desired wiring pattern by a press or the like with a desired portion thereof bent, as required, to provide for an electric connection portion for connection to the female-female terminal. On the other hand, the female-female terminal is made up of a rectangular frame element and an elastic piece wound vertically in an interior of the frame element, so that the electric connection portion is fittingly inserted between the frame element and the elastic piece for establishing an electric continuity.

Incidentally, the electric connection portion of the bas bar is formed by being bent by a press, but when so worked, there may occur a case where the electric connection portion is reversed slightly from the angle at which the portion is bent (elastic deformation), leading to a situation in which the electric connection portion so reversed comes into interference with the female-female terminal when attempting to fitting the female-female terminal on the electric connection portion provided to erect within the recessed portion to thereby result in a problem where the female-female terminal cannot properly be fitted on the electric connection portion. Due to this, bends of electric connection portions were corrected one by one by the hands of assembling workers, but due to a number of bus bars being laid out in the lower case, such correcting work became extremely troublesome work.

Even though the accuracy of the bending work of electric connection portions is enhanced, there occurs a case where an electric connection portion is inclined due to various factors such as an attaching condition of the bus bar to the lower case, the material of the bus bar itself and the like for interference with the female-female terminal, and hence, the enhancement in the accuracy of the bending work cannot constitute a basic solution to the problem.

To cope with this, an object of the invention is to provide a bus bar mounting structure which can automatically correct the bend of the electric connection portion of the bus bar so as to enable the proper connection between the electric connection portion and an external element (for example, the female-female terminal) in a simple construction and in an ensured fashion.

SUMMARY OF THE INVENTION

To accomplish the aforesaid technical object, the following technical measures are contrived in a bus bar mounting structure according to the invention.

Namely, according to a first aspect of the invention, there is provided a bus bar mounting structure including a strip-shaped bus bar including, in turn, a wiring portion which is provided in a predetermined shape and an electric connection portion which is bent to erect for connection to an external element, a first plate on which the bus bar is laid out, and a second plate which is mounted on the first plate on which the bus bar is laid out and which has a through hole through which the electric connection portion is passed, wherein a guide portion is projected on a surface of the second plate facing the bus bar so as to be brought into abutment with the electric connection portion to thereby guide the electric connection portion into the through hole.

According to a second aspect of the invention, there is provided a bus bar mounting structure according to the first aspect of the invention, wherein the first plate includes a lower case, and the second plate includes an intermediate case which is provided between an upper case and the lower case so as to be detachably fitted on the lower case.

According to a third aspect of the invention, there is provided a bus bar mounting structure according to the second aspect of the invention, wherein a recessed portion is provided in the lower case for accommodating therein a female-female terminal which includes a rectangular frame element and an elastic piece wound vertically in an interior of the frame element, which holds the electric connection portion or a connection terminal of a distributing component by the frame element and the elastic piece, and the through hole is provided at a lower portion within an interior of the recessed portion, whereby the female-female terminal is accommodated within the recessed portion after the intermediate plate is mounted on the lower case so as to guide the electric connection portion by the guide portion, and thereafter, the upper case is fitted on the lower case.

According to a fourth aspect of the invention, there is provided a bus bar mounting structure according to any of the first to third aspects of the invention, wherein the guide portion is such that an inclined surface which is gradually narrowed toward a leading portion thereof is formed on a surface thereof facing the through hole.

Since the guide portion is projected on the surface of the second plate facing the bus bar so as to be brought into abutment with the electric connection portion to thereby guide the electric connection portion into the through hole, even though the through hole and the electric connection portion happen to deviate in position from each other, the electric connection portion is brought into abutment with the guide portion so as to be guided into the through hole, whereby the insertion of the electric connection portion into the through hole can be ensured. Consequently, the bus bar mounting structure can be provided which ensures the electric connection between the electric connection portion and the female-female terminal accommodated in the recessed portion formed in the plate surface of the lower case.

In addition, since the second plate is made to constitute the intermediate plate which is adapted to be provided between the upper case, which is detachably fitted on the lower case, and the lower case, so that the intermediate plate can correct the bend of the electric connection portion only be being inserted between the upper case and the lower case, for example, the female-female terminal can be fittingly inserted into the recessed portion where the electric connection portion is provided to erect therein in simple and ensured fashions, thereby making it possible to provide the bus bar mounting structure in which the workability is extremely improved.

BRIEF DESCRIPTION OF THE DRAWINGS

FIG. 6 is an exploded sectional view of an electric junction box to which a conventional bus bar mounting structure is applied.

DETAILED DESCRIPTION OF THE PREFERRED EMBODIMENTS

Figure 1:
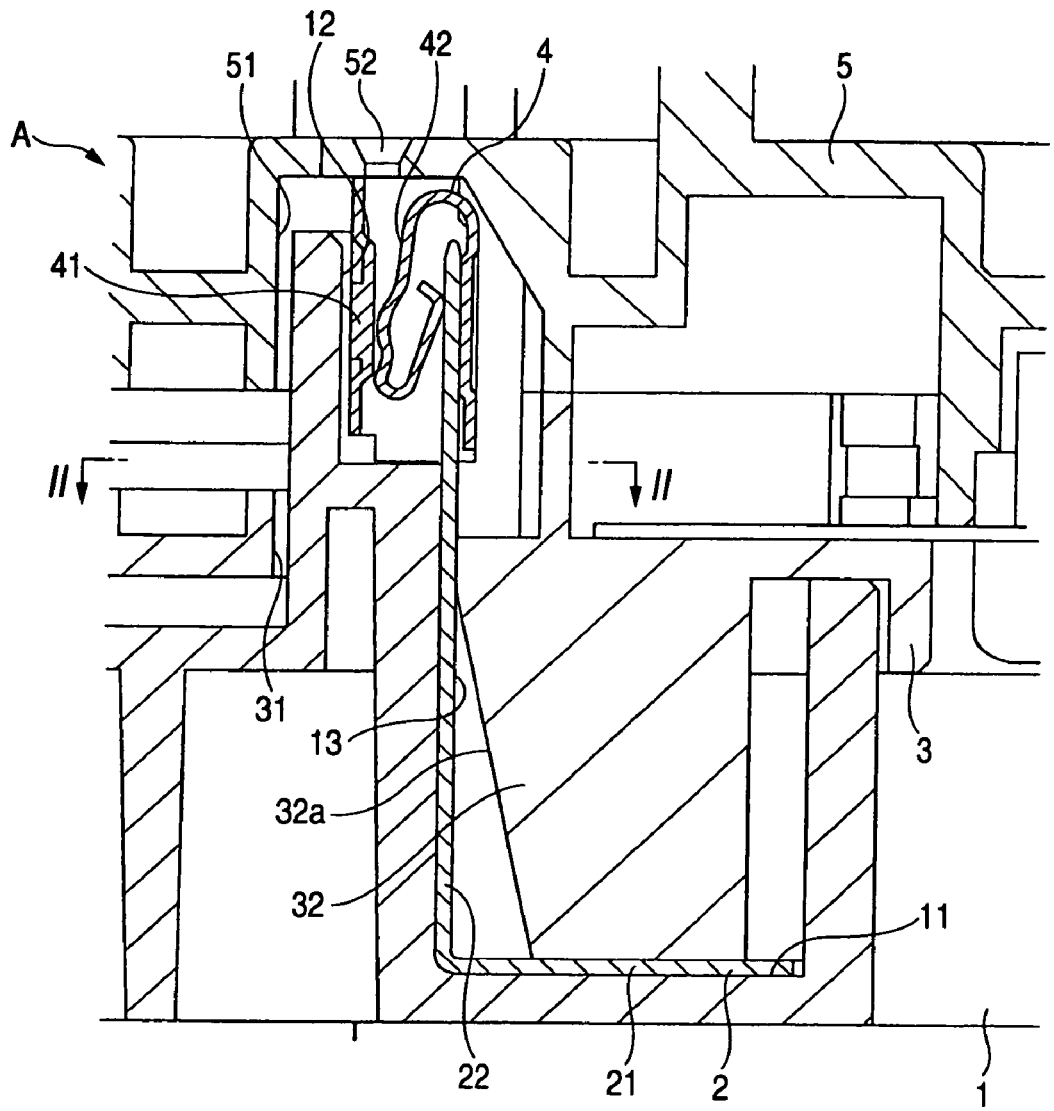
FIG. 1 is a vertical sectional view of a main part of an electric junction box to which a bus bar mounting structure according to an embodiment of the invention is applied.

Next, an embodiment of a bus bar mounting structure according to the invention will be described based on the accompanying drawings. An embodiment of a bus bar mounting structure of the invention shows an example in which the invention is applied to an electric junction box for use as an automotive component. Note that this electric junction box is such that a battery, an ignition switch, an inverter and the like are provided so as to be wired by way of this electric junction box, whereby a solenoid relay is activated based on an output signal from the ignition switch, so that a main electric power is sent to the inverter while detecting the state of the battery by a voltage sensor, and the function thereof as an electric junction box is such as to be known. In the drawings, reference numeral 1 denotes a lower case, reference numeral 2 a bus bar, reference numeral 3 an intermediate plate, reference numeral 4 a female-female terminal and reference numeral 5 an upper case.

Figure 2:
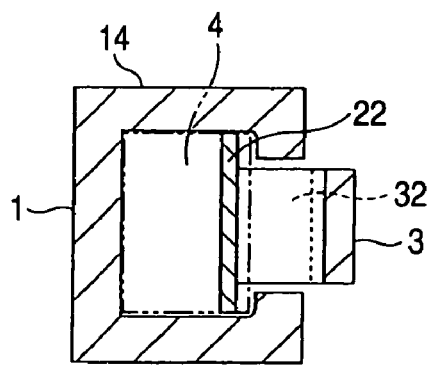
FIG. 2 is a sectional view taken along the line II-II in FIG. 1.
Figure 3:
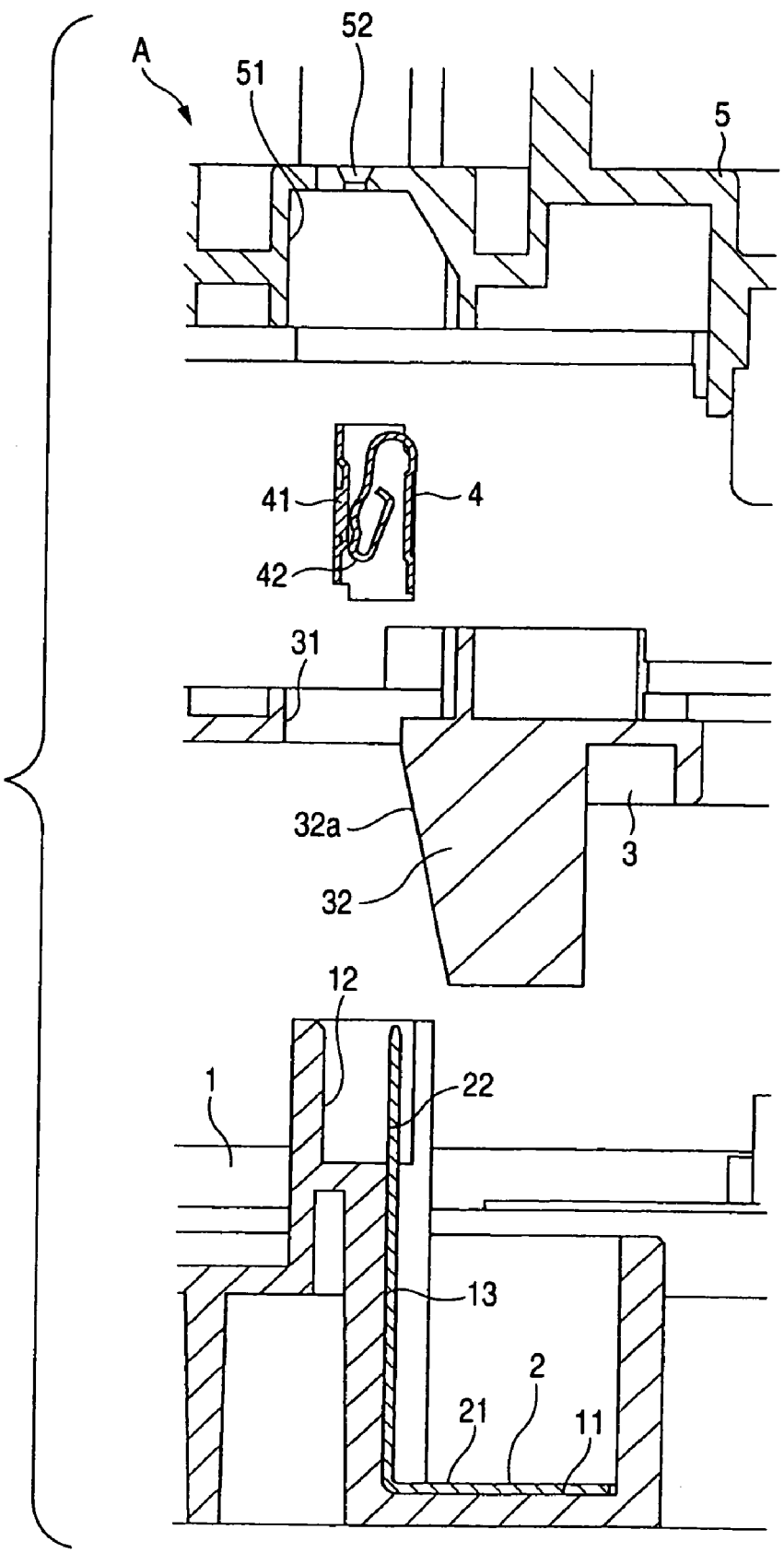
FIG. 3 is an exploded sectional view of the main part.

Firstly, an electric junction box A to which a bus bar mounting structure according to an embodiment of the invention is configured so as to include a lower case 1, a distributing component, a bus bar 2, an intermediate plate 3, a female-female terminal 4 and an upper case 5, as shown in FIGS. 1 to 3.

In the lower case 1, a bus bar resting surface 11, which causes the bus bar 2, which will be described later on, to rest at a predetermined position, a distributing component accommodating portion (not shown) and a recessed portion 12 which is formed into a U-like shape as viewed from the top thereof are formed on an upper side thereof. This recessed portion 12 is, as shown in FIG. 1, provided at a top portion of a guide wall 13 which is formed so as to extend upward from an end portion of the bus bar resting surface 11. In addition, this guide wall 13 is, as shown in the figure, such that a base portion of an electric connection portion 22, which will be described later on, of the bus bar 2 is brought into abutment therewith so that the electric connection portion 22 is guided upward by the guide wall 13.

The distributing component (not shown) is constituted by a fuse, a solenoid relay, a voltage sensor or the like and is accommodated in the distributing component accommodating portion (not shown).

The bus bar 2 includes a wiring portion 21 which is provided in a desired form and the electric connection portion 22 which is bent to erect upward for connection to an external element, and is formed by being blanked out from sheet metal having conductivity such as sheet copper into a batten shape to provide for a desired wiring pattern by a press or the like with a desired portion thereof bent, as required, to provide for the electric connection portion 22 for connection to the female-female terminal 4. The bus bar 2, which is configured in this way, is placed on the bus bar resting surface 11 formed in the lower case 1.

The intermediate plate 3 is a sheet-like plate in which a through hole 31 is provided at a predetermined position which avoids the interference with irregularities formed in the lower case 1, and in particular, a guide portion 32 is provided at a lower edge portion of the through hole 31 through which the recessed portion 12 and the guide wall 13 are passed so as to protrude therefrom so that the electric connection portion 22 is brought into abutment with the guide portion 32 so as to be guided into the through hole 31.

An inclined surface 32a, which appears substantially rectangular as viewed from the bottom thereof and which is narrowed toward a leading portion thereof, is formed on a surface of the guide portion 32 facing the through hole 31, so that when the intermediate plate 3 is pushed in a direction of the lower case 1, the wiring portion 21 of the bus bar 2 is pressed against by a bottom surface of the guide portion 32, and at the same time, the electric connection portion 22 of the bus bar 2 is corrected in position so as to be perpendicular, whereby the electric connection portion 22 is made to erect from the through hole 31.

The female-female terminal 4 is made up of a rectangular frame element 41 which appears substantially rectangular as viewed from the top thereof and has conductivity and a conductive elastic piece 42 which is provided so as to protrude from an interior of the frame element 41 and is wound vertically so as to be substantially accommodated within the frame element 41, and is detachably fitted in the recessed portion 12 on which the intermediate plate 3 is fitted or the distributing component accommodating portion. In addition, when the electric connection portion 22 of the bus bar 2 or a connection terminal of the distributing component is fittingly inserted between the frame element 41 and the elastic piece 42 (at a lower end of the female-female terminal 4), whereas an electric connection portion 22 of a bus bar 2 which extends from an external electronic apparatus or the like or a connection terminal of an external electronic apparatus or the like is fittingly inserted between the frame element 41 and the elastic piece 42 (at an upper end thereof), both the electric connection portions 22 or the connection terminals are electrically connected.

In the upper case 5, a holding portion 51 is recessed into a bottom side thereof so as to be superposed on the recessed portion 12 and the distributing component accommodating portion, and a communication hole 52 is provided in the bottom side which communicates with the upper end of the female-female terminal 4, and the upper case 5 is adapted to be detachably fitted on the lower case 1.

Next, an assembling process of the electric junction box A to which the bus bar mounting structure configured as has been described heretofore will be described sequentially.

Firstly, the bus bar 2 is placed on the bus bar resting surface 11 of the lower case 1 while pressing the base portion of the electric connection portion 22 of the bus bar 2 against the guide wall 13.

Figure 4:
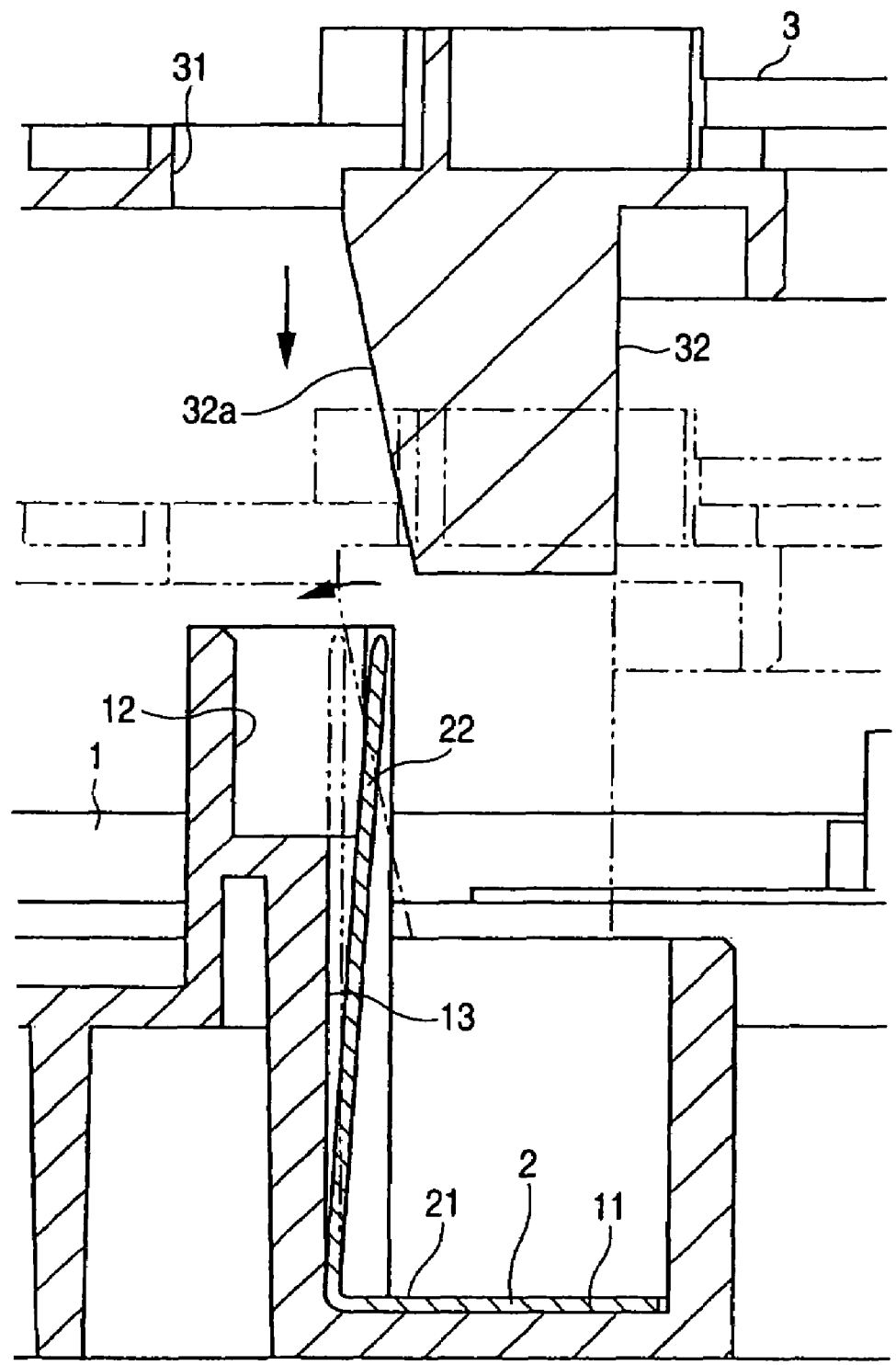
FIG. 4 is an exploded sectional view which illustrates a state in which an intermediate plate is fitted on a lower case.
Figure 5:
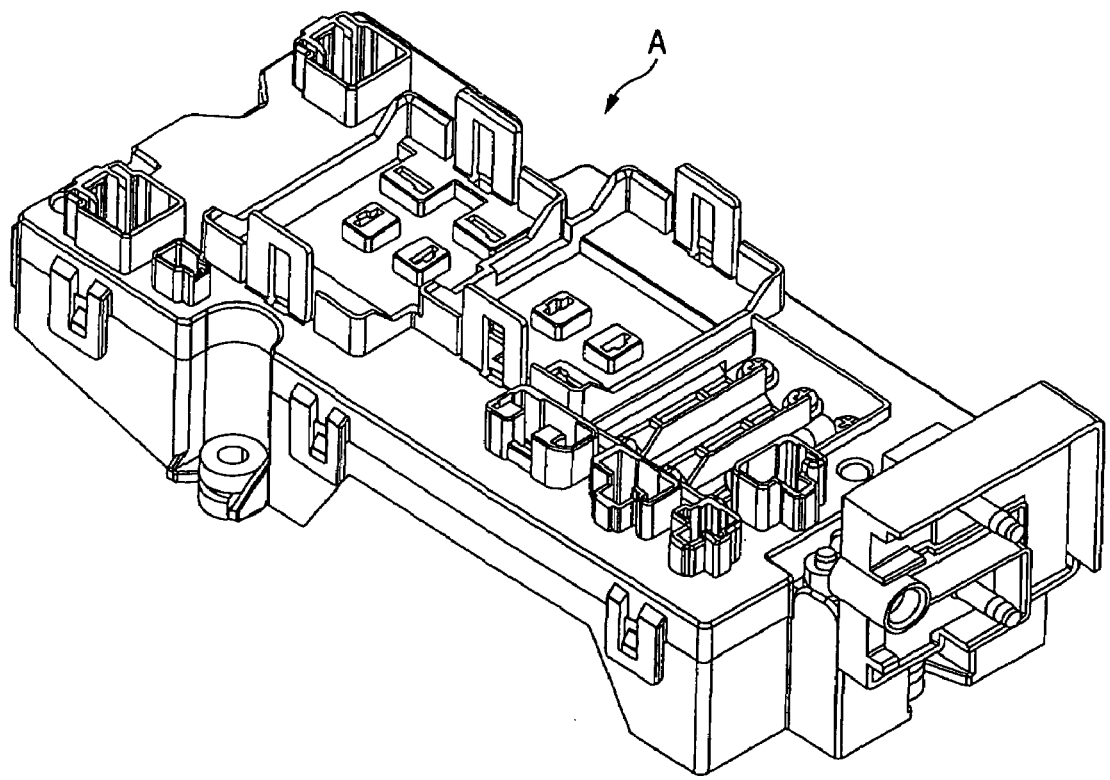
FIG. 5 is a perspective view which shows an external appearance of the electric junction box.

Following this, the intermediate plate 3 is pushed in the direction of the lower case 1, whereby the wiring portion of the bus bar 2 is pressed against by the bottom surface of the guide portion 32, and at the same time, the electric connection portion 22 is caused to erect from the through hole 13. As this occurs, even though the electric connection portion 22 is reversed from the angle at which it was bent, the electric connection portion 22 is corrected in position so as to be perpendicular as indicated by chain double-dashed lines in FIG. 4 when it is brought into abutment with the inclined surface 32a so as to be guided, whereby the electric connection portion 22 erects from the through hole 31 (refer to FIG. 4). Then, the female-female terminal 4 is fittingly inserted into the recessed portion 12 on which the intermediate plate 3 is fitted, and the distributing component is accommodated in the distributing component accommodating portion. Following this, the upper case 5 is fitted on the lower case 1, and the series of assembling steps is completed.

According to the electric junction box A to which the bus bar mounting structure according to the embodiment of the invention is applied, the intermediate plate 3 is adapted to correct the bend of the electric connection portion 22 only by being inserted between the upper case 5 and the lower case 1. Thus, the bus bar mounting structure results in which the workability is extremely improved due to the female-female terminal 4 being able to be fittingly inserted into the recessed portion 12 where the electric connection portion 22 erects in simple and ensured fashions.

Thus, while the electric junction box A to which the bus bar mounting structure according to the embodiment of the invention is applied has been described heretofore, the embodiment that has been so described illustrates only one example of the preferred embodiment of the invention, and the invention is not limited thereto but can be embodied in various ways without departing from the spirit and scope of the invention.

What is claimed is:

1. A bus bar mounting structure comprising:
    a strip-shaped bus bar including a wiring portion which is provided in a predetermined shape and an electric connection portion which is bent to erect for connection to an external element;
    a first plate having a bus bar resting surface on which the bus bar is laid out; and
    a second plate which is mounted on the first plate on which the bus bar is laid out and which has a through hole through which the electric connection portion is passed;
    wherein a guide portion having a bottom surface and an inclined surface adjacent to the bottom surface is projected on a surface of the second plate facing the bus bar; and
    wherein the bottom surface of the guide portion presses the wiring portion of the bus bar onto the bus bar resting surface, and the inclined surface of the bus bar is brought into abutment with the electric connection portion so that the electric connection portion is guided into the through hole.

2. A bus bar mounting structure according to claim 1, wherein the first plate includes a lower case, and the second plate includes an intermediate case which is provided between an upper case and the lower ease so as to be detachably fitted on the lower case.

3. A bus bar mounting structure according to claim 1, wherein the guide portion is such that an inclined surface which is gradually narrowed toward a leading portion thereof is formed on a surface thereof facing the through hole.

4. A bus bar mounting structure comprising:
    a strip-shaped bus bar including a wiring portion which is provided in a predetermined shape and an electric connection portion which is bent to erect for connection to an external element;
    a first plate on which the bus bar is laid out; and
    a second plate which is mounted on the first plate on which the bus bar is laid out and which has a through hole through which the electric connection portion is passed;
    wherein a guide portion is projected on a surface of the second plate facing the bus bar so as to be brought into abutment with the electric connection portion to thereby guide the electric connection portion into the through hole;
    wherein the first plate includes a lower case, and the second plate includes an intermediate case which is provided between an upper case and the lower case so as to be detachably fitted on the lower case; and
    wherein a recessed portion is provided in the lower case for accommodating therein a female-female terminal which comprises a rectangular frame element and an elastic piece wound vertically in an interior of the frame element, and holds the electric connection portion or a connection terminal of a distributing component by the frame element and the elastic piece, and
    the through hole is provided at a lower portion within an interior of the recessed portion,
    whereby the female-female terminal is accommodated within the recessed portion after the intermediate plate is mounted on the lower case so as to guide the electric connection portion by the guide portion, and thereafter, the upper case is fitted on the lower case.

* * * * *